United States Patent [19]
Mathey et al.

[11] 3,878,246
[45] Apr. 15, 1975

[54] PROCESS FOR PRODUCING FLUORINATED ORGANIC COMPOUNDS CONTAINING A DIFLUOROMETHYLENE GROUP FROM COMPOUNDS COMPRISING AT LEAST ONE CARBONYL FUNCTION

[75] Inventors: Francois Mathey; Jean Bensoam, both of Ballancourt, France

[73] Assignee: Institut National de Recherche Chimique Appliquee, Paris, France

[22] Filed: Sept. 30, 1971

[21] Appl. No.: 185,362

[30] Foreign Application Priority Data
Oct. 15, 1970 France .............................. 70.37317

[52] U.S. Cl........... 260/653.8; 260/653; 260/648 F; 260/649 F; 260/650 F; 260/651 F; 260/478
[51] Int. Cl.............................................. C07c 17/18
[58] Field of Search..... 260/653.8, 653, 478, 649 F, 260/648 F, 651 F, 650 F

[56] References Cited
UNITED STATES PATENTS
2,859,245   11/1958   Smith............................... 260/653.8

OTHER PUBLICATIONS
Mathey et al., Chem. Abstracts 75, 118073C (1971).

*Primary Examiner*—Delbert E. Gantz
*Assistant Examiner*—Joseph A. Boska
*Attorney, Agent, or Firm*—Karl W. Flocks

[57]        ABSTRACT
A novel process for producing fluorinated organic compounds containing a difluoromethylene group, essentially characterized by reacting organic compounds containing a carbonyl function with molybdenum hexafluoride at room temperature and under atmospheric pressure.

9 Claims, No Drawings

PROCESS FOR PRODUCING FLUORINATED ORGANIC COMPOUNDS CONTAINING A DIFLUOROMETHYLENE GROUP FROM COMPOUNDS COMPRISING AT LEAST ONE CARBONYL FUNCTION

The present invention relates to a novel process for producing fluorinated organic compounds containing a difluoromethylene group.

Compounds of this type are well known and in recent years have gained importance because of their particular chemical and physical properties, such as good thermal resistance and oxidisation resistance. They are also in great demand in pharmaceutical chemistry. For these reasons, simple and economical processes have been sought for obtaining these products.

The fluorination processes up to the present time use reagents which are toxic or not easily obtainable, or which may even require the use of special equipment. They often lead to secondary polymerisation and decomposition reactions. In particular, fluorination of carbonyl groups into difluoromethylene groups has been performed by the use of the fluorinated reagent $SF_4$ (see U.S. Pat. No. 2 859 245). In addition to the fact that this latter process uses an eminently toxic gas derivative, it is difficult to perform. In fact, the solid or liquid reagents must be fed into a hastelloy apparatus under an atmosphere of nitrogen; thereafter one must cool to $-80°C$, sweep the gases, introduce $SF_4$, react the mixture at the desired temperature (approx. 100°C), then recool to $-80°C$ and finally open the autoclave. The products are then separated. Moreover, it should be pointed out that there is a significant consumption of the reagent $SF_4$ of which molar excesses attaining 1.5 to 4 are used.

Therefore, one of the objects of the invention is to provide a simple reagent which is easy to use for synthesizing fluorinated organic compounds containing a difluoromethylene group.

Therefore, the process of the invention is essentially characterized by the fact that the organic compounds containing the carbonyl function are reacted with molybdenum hexafluoride at room temperature and under atmospheric pressure in a glass vessel.

Examples of the numerous compounds containing the carbonyl group are aliphatic aldehydes and ketones, aromatic aldehydes and ketones, aromatic polyaldehydes and polyketones, fluorinated and non fluorinated arylaliphatic ketones, cyclic ketones, aliphatic ketone esters and the like.

The molybdenum hexafluoride employed as the reagent in accordance with the invention can be prepared through any of the methods described in various articles, such as, for example, that of O. RUFF and E. ASHER (Z. ANORG. ALLG. CHEM. 196, 418, 1931) which involves the direct combustion of molybdenum in fluorine. Molybdenum hexafluoride is liquid at room temperature (b.pt. 35°C at normal pressure); consequently it is very easy to use.

According to other aspects of the invention:
the two reagents are in solution in an inert solvent. Methylene chloride is an example of a suitable solvent. The solvent is chosen such that separation of the reagents and the reaction products is easiest as possible;
the reaction temperatures are advantageously chosen between $-20°C$ and $+40°C$;
the reagents used in the reaction are substantially anhydrous;
the reaction is carried out under an inert atmosphere;
the percentages of the reagents and the reaction conditions necessary to obtain the highest yields are determined by the chemical reactivity and the stability of the reagents and the fluroinated products obtained in the reaction;
the molybdenum hexafluoride to carbonyl compound molar ratio is 1:1 per carbonyl group contained in the molecule. An excess of molybdenum hexafluoride leads to lower yields;
the reaction time varies between 1 and 12 hours;
the fluorination process can be performed in the presence of a catalyst preferably selected from the group comprising fluoride ion acceptors such as those of the strong Lewis acid type, for example boron trifluoride or antimony pentafluoride. The use of such a catalyst greatly increases reaction velocity and yields and reduces the amount of secondary reaction products;
according to a preferred embodiment, a methylene chloride solution of the carbonyl compound is added to a methylene chloride solution of molybdenum hexafluoride through which have been bubbled a few cm3's of $BF_3$.

At the end of the reaction, the isolation and purification of the fluorinated products is performed by well-known chemical and physical methods. For example, the reaction mixture can be stirred with a hydrofluoride acid acceptor such as an alkaline fluoride; after filtration, a passage over alumina suffices to remove all the inorganic products formed during and subsequent to the reaction. Thereafter, a distillation or a recrystallization may be performed. As for the residual molybdenum derivatives, they may be hydrolysed and converted into $MoO_3$ which is readily purifiable by sublimation. The molybdenum which has thus been isolated may be reconverted to $MoF_6$ and reused.

The reaction involved in performing the process of the present invention may be schematically shown in the following manner:

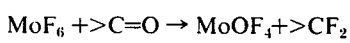

$$MoF_6 + >C=O \rightarrow MoOF_4 + >CF_2$$

The following examples are given merely by way of an illustration and are in no way intended to limit the invention:

EXAMPLE 1

1,1-Difluorocyclohexane 200 ml of $CH_2Cl_2$ freshly distilled over $P_2O_5$ and 14 ml of $MoF_6$ (i.e. 35.6 gr.; 0.169 moles) were introduced into a stirred 500 ml flask equipped with a gas inlet, a condenser and a drop funnel. The solution which was initially blue, then green, finally turned yellow brown. The mixture was cooled to 0°C and a slight stream of $BF_3$ gas was passed for 5 minutes then, between $-15°C$ and $-10°C$, 16.6 gr. (0.17 moles) of distilled cyclohexanone, diluted in 90 ml of $CH_2Cl_2$, were poured into the mixture dropwise. The solution became dark red. The temperature of the mixture was allowed to slowly rise to room temperature; thereafter, the mixture was stirred for 3 hours. The mixture was then water treated; the organic layer was washed and dried over $Na_2SO_4$; the $CH_2Cl_2$ was distilled off under reduced pressure and the residue was carefully fractionnated.

10.7 gr. of 1,1-difluorocyclohexane were thus obtained (yield=approx. 53 percent).

b.pt. 96.5°–97.5°C (literature b.pt. 97°–98°C).
$n_D^{25}=1.3882$ (literature $n_D^{25}=1.3890$)

| Analysis | C | H | F |
|---|---|---|---|
| calculated: | 59.98 % | 8.39 % | 31.63 % |
| found: | 59.90 % | 8.17 % | 31.28 % |

EXAMPLE 2

Difluorodiphenylmethane

Example 1 was repeated with 31 gr. (0.17 moles) of benzophenone recrystallized in petroleum ether. Considering the fact that difluorodiphenylmethane ($\phi_2CF_2$) is hydrolysable, all water treatments are prescribed. The resulting solution was stirred for 15 minutes with sodium fluoride then with alumina. The methylene chloride was evaporated and the residue was distilled, both procedures being performed in vacuo.

19 gr. of difluorodiphenylmethane ($\phi_2CF_2$) were obtained (yield=55 percent).
b.pt. 67°–68°C/0.2 mm Hg
$n_D^{25}=1.5410$ (literature $n_D^{25}=1.5390$)

| Analysis | C | H | F |
|---|---|---|---|
| calculated: | 76.47 % | 4.90 % | 18.63 % |
| found: | 76.67 % | 4.74 % | 18.20 % |

EXAMPLE 3

Benzylidene Fluoride

Example 2 was repeated with 17.2 gr. (0.169 moles) of benzaldehyde. 9.0 gr. of benzylidene fluoride ($\phi CHF_2$) were obtained (yield=41 percent).
b.pt. 69°–70°C/100 mm Hg (literature b.pt. 133.5°C)
$n_D^{25}=1.4562$ (literature $n_D^{25}=1.4577$)

| Analysis | C | H | F |
|---|---|---|---|
| calculated: | 65.62 % | 4.69 % | 29.69 % |
| found: | 65.67 % | 4.61 % | 29.44 % |

EXAMPLE 4

Pentafluoroethylbenzene

Example 2 was repeated with 30 gr. (0.75 moles) of trifluoroacetophenone ($\phi COCF_3$). 13 gr. of pentafluoroethylbenzene ($\phi C_2F_5$) were obtained (yield=38 percent).
b.pt. 55°C/100 mm Hg (literature b.pt. 128°–129°C/733 mm Hg)
$N_D^{25}=1.3920$

| Analysis | E | H | F |
|---|---|---|---|
| calculated: | 48.98 % | 2.55 % | 48.47 % |
| found: | 48.86 % | 2.76 % | 48.11 % |

EXAMPLE 5

Tetrafluoro-1,1,2,2-diphenyl-1,2-ethane

Example 2 was repeated with 19gr. of benzil (0.09 moles) ($\phi CO-CO\phi$).
8 gr. of tetrafluoro-1,1,2,2-diphenyl-1,2-ethane ($\phi CF_2-CF_2\phi$) were obtained (yield=35 percent).
m.p. 123°C (literature m.p. 122°–123°C)

| Analysis | C | H | F |
|---|---|---|---|
| calculated: | 66.14 % | 3.94 % | 29.92 % |
| found: | 65.71 % | 3.76 % | 29.89 % |

EXAMPLE 6

P-bis (Difluoromethyl) Benzene

Example 2 was repeated using 12.5 gr. of terephthalic aldehyde.
6 gr. of p-bis (difluoromethyl) benzene of formula:

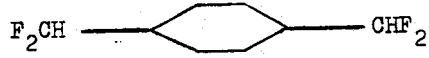

were obtained (yield=30 percent).
b.pt. 68°–70°C/20 mm Hg (literature b.pt. 90°C/40 mm Hg)
$n_D^{25}=1.4381$ (literature $n_D^{25}=1.4378$)

| Analysis | C | H | F |
|---|---|---|---|
| calculated: | 53.93 % | 3.37 % | 42.70 % |
| found: | 53.89 % | 3.14 % | 42.67 % |

EXAMPLE 7

1,1-Difluoro-n-heptane

Example 2 was repeated using 25.5 gr. of heptyl aldehyde (0.224 moles).
6 gr. of 1,1-difluoro-n-heptane were obtained (yield=20 percent);
$n_D^{20}=1.3730$ (literature $n_D^{20}=1.3710$)

| Analysis | C | H | F |
|---|---|---|---|
| calculated: | 61.76 % | 10.29 % | 27.94 % |
| found: | 59.94 % | 10.63 % | 28.17 % |

EXAMPLE 8

Ethyl γ,γ-difluoro-valerate

Example 2 was repeated using 33 gr. of ethyl levulinate of formula:

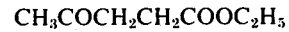

6 gr. of product having formula:

were obtained (yield=17 percent).
b.pt. 66°C/20 mm Hg (literature b.pt. 70°–72°C/27 mm Hg)
$n_D^{25}=1.3798$.

| Analysis | C | H | F |
|---|---|---|---|
| calculated: | 50.52 % | 7.14 % | 22.98 % |
| found: | 50.60 % | 7.23 % | 22.90 % |

EXAMPLE 9

Benzoyl Fluoride

Example 2 was repeated and benzoyl fluoride obtained. This product is characterized by the formation of benzoylamide through reaction with $NH_4OH$.
The benzoylamide had a m.p. of 128°–129°C (literature m.p. 128°C).

| Analysis | C | H | N |
|---|---|---|---|
| calculated: | 69.42 % | 5.78 % | 11.57 % |
| found: | 68.75 % | 5.68 % | 11.58 % |

EXAMPLE 10

Difluoro-3,3-heptane

Example 2 was repeated for the treatment of 3-heptanone and the gem-difluorinated derivative (difluoro-3,3-heptane) was obtained (yield=35 percent). The latter is a new industrial product.

b.pt. 56°C/105 mm Hg $n_D^{25} = 1.3690$

| Analysis | C | H | F |
|---|---|---|---|
| calculated: | 61.82 % | 10.39 % | 27.92 % |
| found: | 61.76 % | 10.29 % | 27.90 % |

EXAMPLE 11

By starting with terephthalophenone of formula:

$C_6H_5-CO-C_6H_4-CO-C_6H_5$ and by using the operational procedure of example 2, a mixture of two compounds of the following formulae were obtained:

$C_6H_5-CO-C_6H_4-CF_2-C_6H_5$ (yield=20 percent)

and $C_6H_5-CF_2-C_6H_4-CF_2-C_6H_5$ (yield=20 percent)

The above examples which were performed with simple aldehydes and ketones are highly illustrative: they only give rise to a limited number of secondary reactions. It should be noted, however, that molybdenum hexafluoride can also react with organic compounds having other reactive functions. Thus, for example, the carbonyl compounds comprising hydroxyl or carboxyl groups may react with molybdenum hexafluoride, giving mixtures of fluorinated products.

The treatment of carboxylic acids leads to the replacement of the hydroxyl group by a fluorine atom. Through simple hydrolysis, the resultant acid fluoride regenerates the corresponding acid. The above-mentioned operational conditions do not lead to a conversion of the carboxyl group to a trifluromethyl group (see example 9). It can thus be concluded that the process of the invention constitutes a selective fluorinating process of the keto functions of the ketone acids and esters.

The fluorinated products obtained through the process of the invention are, for the most part, as has been pointed out earlier, well-known compounds. They are present in liquid or solid form. They may be applied to numerous fields, for example as aerosol propellants in the insecticide industry, as solids for use in paints and varnishes as well as intermediary products used for the production of other organic compounds.

Naturally, the above specification is in no way intended to limit the invention and has only been given by way of an illustration of the invention.

We claim:

1. Process for fluorinating a carbonyl organic compound containing at least one ketone or aldehyde group, comprising:

reacting substantially anhydrous molybdenum hexafluoride as fluorinating agent with said organic compound, said organic compound being substantially anhydrous, in solution in an inert organic solvent in a glass vessel at a temperature of about −20°C to about +40°C under atmospheric pressure and under an inert atmosphere to replace the oxygen of the ketone or aldehyde group with two fluorine atoms, the molar ratio of $MoF_6$ to said ketone or aldehyde group being no greater than about 1:1.

2. Process according to claim 1 wherein said carbonyl organic compound is selected from the group consisting of aliphatic aldehydes and ketones.

3. Process according to claim 1 comprising adding a methylene chloride solution of said carbonyl organic compound to a methylene chloride solution of molybdenum hexafluoride.

4. Process according to claim 1 wherein the molybdenum hexafluoride to carbonyl compound molar ratio is of 1:1.

5. Process according to claim 1 wherein the reaction period is from 1 to 12 hours.

6. Process according to claim 2 wherein said carbonyl organic compound is 3-heptanone whereby gem-difluorinated (difluoro-3,3-heptane) is obtained.

7. Process according to claim 1 wherein said inert solvent contains as a catalyst a fluoride ion acceptor.

8. Process according to claim 7 wherein said fluoride ion acceptor is a strong Lewis acid.

9. Process according to claim 1 wherein the reaction is conducted in the presence of a catalyst selected from the group consisting of fluoride ion acceptors of boron trifluoride and antimonium pentafluoride.

* * * * *